United States Patent
Lindrose et al.

[11] Patent Number: 6,040,960
[45] Date of Patent: Mar. 21, 2000

[54] AIR DAMPER FOR DISC DRIVE ACTUATOR LATCH MECHANISM

[75] Inventors: Albert Michael Lindrose, Boulder; Frederick Mark Stefansky, Longmont, both of Colo.

[73] Assignee: Seagate Technology, Inc., Scotts Valley, Calif.

[21] Appl. No.: 09/089,677

[22] Filed: Jun. 3, 1998

Related U.S. Application Data

[60] Provisional application No. 60/048,753, Jun. 3, 1997.

[51] Int. Cl.⁷ ........................................................ G11B 5/54
[52] U.S. Cl. ............................................................. 360/105
[58] Field of Search ....................................... 360/105, 106

[56] References Cited

U.S. PATENT DOCUMENTS

| | | | |
|---|---|---|---|
| 4,237,504 | 12/1980 | Ho et al. | 360/106 |
| 5,170,300 | 12/1992 | Stefansky | 360/105 |
| 5,187,627 | 2/1993 | Hickox et al. | 360/105 |
| 5,343,346 | 8/1994 | Bleeke | 360/105 |
| 5,663,855 | 9/1997 | Kim et al. | 360/105 |
| 5,812,346 | 9/1998 | Williams et al. | 360/105 |
| 5,864,447 | 1/1999 | Matsumoto et al. | 360/105 |

*Primary Examiner*—Brian E. Miller
*Attorney, Agent, or Firm*—Edward P. Heller, III; Raghunath S. Minisandram

[57] ABSTRACT

A passive actuator latching system in which a magnetic latch mechanism is mounted on an air damping mechanism. The air damping mechanism is optimized to the moving mass of the actuator and the specified mechanical shock tolerance to allow a relatively weak magnetic latch to resist unlatching due to relatively large short-duration mechanical shocks by providing damped compliance to the latching system during the application of mechanical shocks, and attenuating the shock force experienced at the magnetic interface. Various mechanisms for selecting the direction and magnitude of the damping of the compliance are disclosed.

1 Claim, 5 Drawing Sheets

AIR DAMPER FOR DISC DRIVE ACTUATOR LATCH MECHANISM

CROSS REFERENCE TO RELATED APPLICATION

This application claims the benefit of United States Provisional Application Ser. No. 60/048,753, filed Jun. 3, 1997.

FIELD OF THE INVENTION

This invention relates generally to the field of hard disc drive data storage devices, and more particularly, but not by way of limitation, to a damper mechanism which supports an actuator latch and improves the tolerance of the disc drive to applied mechanical shocks.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

When a disc drive is in an unpowered condition, it is common industry practice to move the heads to a predetermined park position and to latch the actuator at the park position in order to prevent uncontrolled contact between the data heads and the data recording areas on the disc surfaces. There are two general types of "head parking": 1) contact start/stop, in which the heads are brought to rest on a specially reserved portion of the discs near the inner diameter, and; 2) ramp parking drives, in which the heads are lifted away from the disc surfaces by ramp structures positioned closely adjacent the outer diameter of the discs.

With either type of parking scheme, some sort of latch is necessary to hold the actuator at the park location in the presence of mechanical shocks applied to the disc drive. The simplest types of latching mechanisms are sometimes grouped together as "passive latch/unlatch" devices, and commonly include magnetic contact between a latch mechanism fixedly mounted to the disc drive housing and a magnetic contact feature mounted on the moving portion of the actuator. During latching operation, the only action needed is to move the actuator to the park position, at which time the magnetic attraction between the latch mechanism and the contact feature causes the actuator to be latched. Unlatching is accomplished by using the actuator motor to move the actuator away from the latch position with sufficient power to overcome the magnetic attraction.

Such latches are simple and inexpensive to implement, but are commonly not capable of withstanding the amounts applied mechanical shocks specified for disc drives of the current and future generations. For instance, disc drives are being specified to withstand radial shock accelerations on the order of 10 to 30 thousand radians per second$^2$ applied over time intervals of 0.001 to 0.003 seconds. While it is relatively simple to design magnetic latches capable of withstanding these types of shocks, the magnetic attraction necessary becomes relatively large, and the power to overcome the magnetic attraction for unlatching of the actuator is often not available in the actuator motor, particularly in disc drives of the present small physical dimensions.

It would therefor be desirable to provide a passive magnetic latching mechanism which is capable of withstanding large amounts of applied mechanical shocks without unintentional unlatching and which would still require a relatively small force to unlatch when such unlatching is intended.

SUMMARY OF THE INVENTION

The present invention is a passive actuator latching system in which a magnetic latch mechanism is mounted on an air damping mechanism. The air damping mechanism is optimized to the moving mass of the actuator and the specified mechanical shock tolerance to allow a relatively weak magnetic latch to resist unlatching due to relatively large short-duration mechanical shocks by providing damped compliance to the latching system during the application of mechanical shocks, and attenuating the shock force experienced at the magnetic interface. Various mechanisms for selecting the direction and magnitude of the damping of the compliance are disclosed.

It is an object of the present invention to provide an actuator latching system for a disc drive.

It is another object of the invention to provide an actuator latching system that is simple to fabricate and inexpensive to manufacture and install.

It is another object of the invention to provide an actuator latching system for a disc drive that is passive in operation, provides secure latching in the presence of large applied mechanical shocks and which can be unlatched with relatively small amounts of available actuator motor power.

The manner in which the present invention accomplishes the objects stated above, as well as other features and benefits of the invention, can best be understood by a review of the following Detailed Description of the Invention when read in conjunction with an examination of the accompanying drawings.

BRIEF DESCRIPTION OF THE DRAWINGS

FIGS. 6-1 and 6-2 are detailed sectional views of some of the components of the present invention and illustrating these components' actions in response to applied mechanical shock.

DETAILED DESCRIPTION OF THE INVENTION

Figure 1:
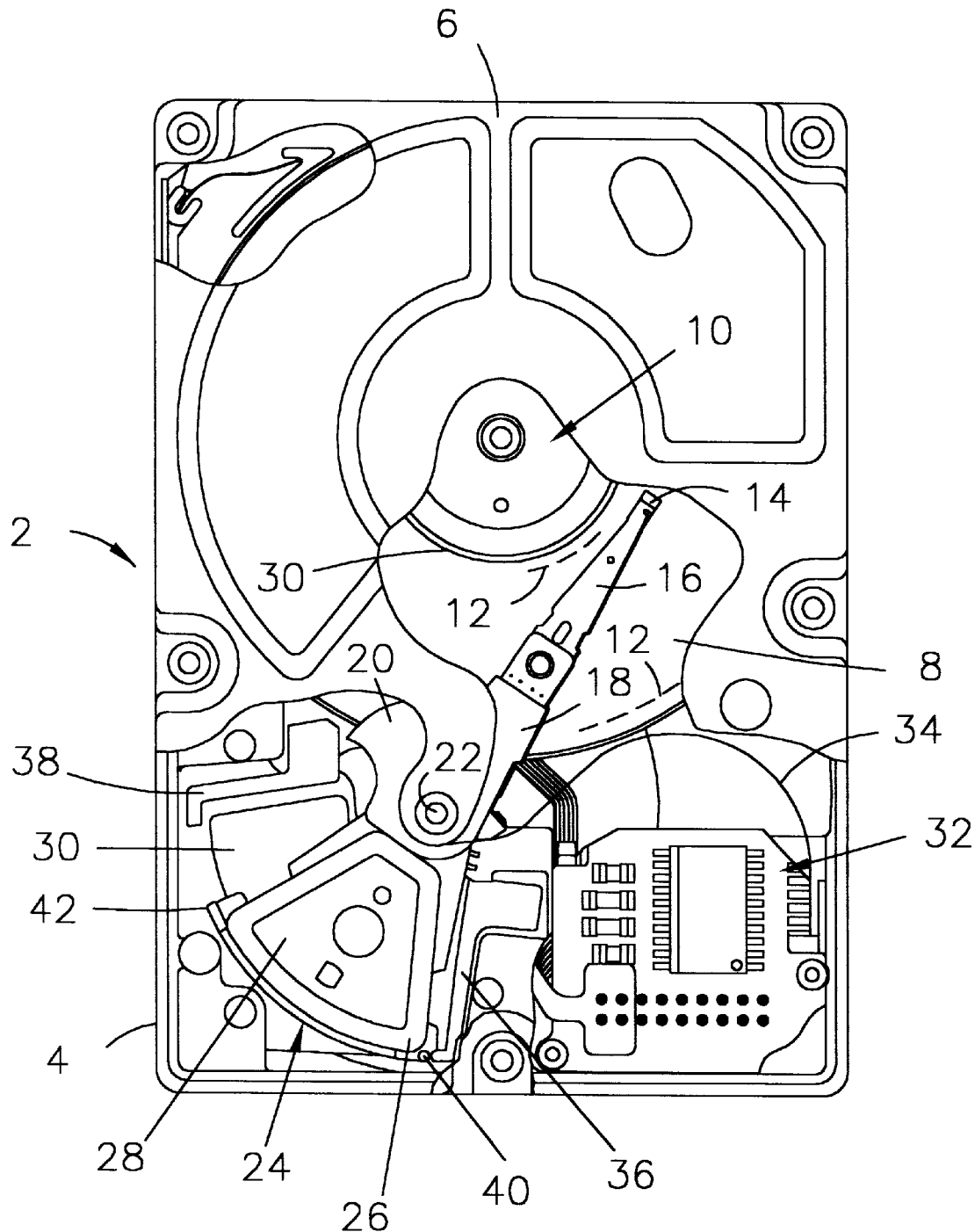
FIG. 1 is a plan view of a disc drive showing a typical prior art actuator latching system.

Turning now to the drawings and specifically to FIG. 1, shown is a typical disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing enclosing delicate internal components and isolating these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil 26 formed around a bobbin 28 and supported by the actuator bearing housing 20 within the magnetic field of an array of permanent magnets, one of which is shown at 30, which are fixedly mounted to the base member 4, all in a manner well known in the industry. Electronic circuitry (partially shown at 32, generally, and partially carried on a printed circuit board (not shown)) to control all aspects of the operation of the disc drive 2 is provided, with control signals to drive the VCM 24 as well as data signals to and from the heads 14, carried between the electronic circuitry and the moving actuator assembly via a flexible printed circuit cable (PCC) 34.

The disc drive 2 also includes a prior art limit stop and actuator latching system consisting of an inner limit stop/latch 36, an outer limit stop 38 and, integrally molded onto the coil 26, inner and outer contact features 40, 42, respectively. The figure shows the actuator at its innermost position relative to the discs 8, with the inner limit stop/latch 36 contacting the inner contact feature 40. It will be apparent to one of skill in the art that, if the actuator were to be rotated about the pivot shaft 22 to its outermost position, with the heads 14 closely adjacent the outer diameter of the discs 8, the outer contact feature 42 would contact the outer limit stop 38. Thus the extremes of the range of motion of the actuator of the disc drive 2 are defined by the inner and outer limit stops 36, 38 in cooperation with the inner and outer contact features 40, 42 carried by the movable coil 26. Additional details of this prior art limit stop/latch system, including the manner in which compliance in the limit stops is achieved, can be found in U.S. Pat. No. 5,262,912, issued Nov. 16, 1993, assigned to the assignee of the present application and incorporated herein by reference.

The prior art disc drive 2 of FIG. 1 is of the "contact start/stop" type which allow the heads 14 to actually contact the discs 8 when power is removed from the disc drive. In such disc drives, the heads 14 are typically parked and latched at the innermost extent of the actuator range of motion, as shown in FIG. 1, in order to minimize the torque required of the spindle motor to overcome the frictional forces between the heads 14 and discs 8. However, it is envisioned that the actuator latching system of the present invention will be equally beneficial in disc drives which park the heads on ramp structures adjacent the outer diameter of the discs.

Figure 2:
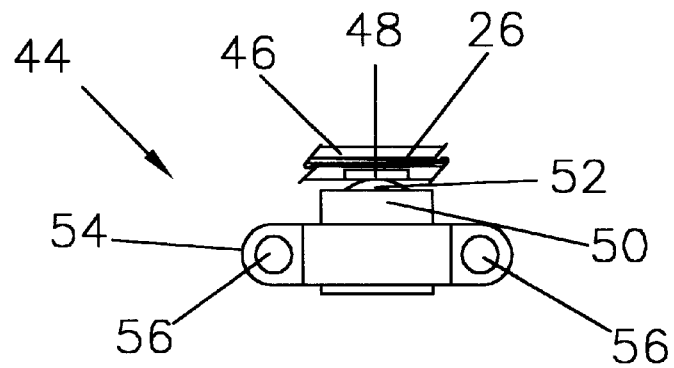
FIG. 2 is a detail plan view of another prior art actuator latching system.

Turning now to FIG. 2, shown is a detail view of the elements of another typical prior art actuator latching system 44. FIG. 2 shows a small part of the moving portion of the actuator, including part of the actuator motor coil 26. As is typical in the art, the coil 26 is supported by a plastic or epoxy coil support structure 46.

The first element of the latching system is a magnetically permeable contact feature, or striker plate, 48 mounted on and movable with the coil support structure 46.

The second element of the latching system is a magnetic "can" 50 which contains a permanent magnet (not shown) and has a spherical contact surface 52. The can 50 is of the type manufactured by Xolox Corporation of Fort Wayne, Indiana, and is fixedly mounted to the disc drive housing (not shown) by, in the example shown, a can bracket 54 through the use of screws (also not shown) inserted through screw holes 56 into cooperative tapped holes in the disc drive housing.

As will be apparent to those of skill in the art, when the actuator is moved to its park position, the contact feature 48 on the moving portion of the actuator will be brought into contact with the spherical contact surface 52 of the magnetic latch mechanism, or can, 50, and be held in the park position as shown in the figure until such time as the actuator motor (24 in FIG. 1) is used to pull the contact feature 48 away from the magnetic latch mechanism 50, freeing the actuator to move the heads across the discs.

It will also be apparent to those of skill in the art, however, that this prior art latching system must provide a compromise between the amount of latching force provided by the latching mechanism 50 and the amount of power available in the actuator motor to separate the latching system elements. Since only a finite amount of power is available in the actuator motor, a comparable maximum latching power can be provided by the latching mechanism 50.

In older disc drives, which had low specified non-operational shock tolerances and relatively large, powerful actuator motors, this compromise was not a problem. However, as previously stated, current disc drives have relatively smaller, less powerful actuator motors and are specified to withstand increasing greater amounts of non-operational shock. Therefore, if a simple, passive latching system, such as that shown in FIG. 2 is to be used in such disc drives, additional engineering considerations must be made.

Figure 3:
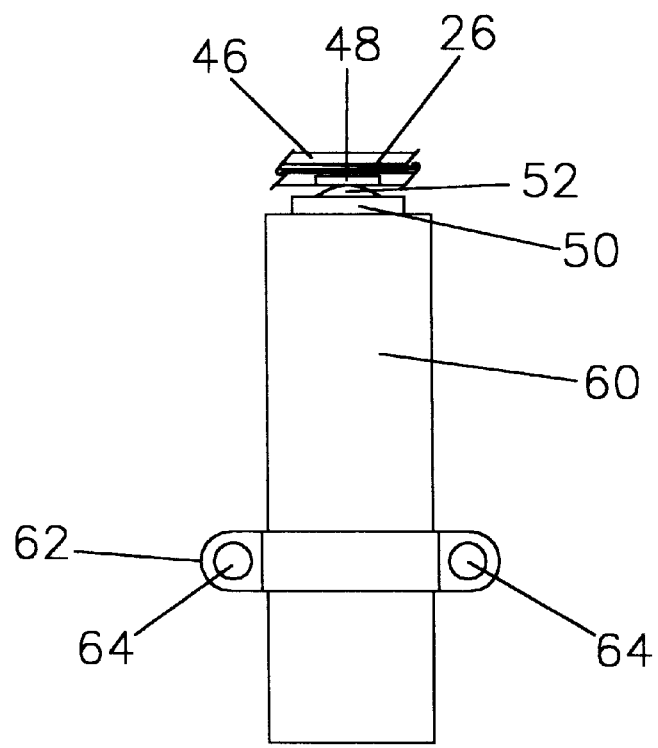
FIG. 3 is a detail plan view of the actuator latching system of the present invention.

FIG. 3 is a detail plan view of an actuator latching system made in accordance with the present invention. The actuator latching system of FIG. 3 includes a magnetically permeable contact feature 48 carried on the moving portion of the actuator, and a magnetic latching mechanism, or Xolox can, 50, as did the prior art actuator latching system of FIG. 2. However, in the actuator latching system of FIG. 3, the can 50 is not directly and fixedly mounted to the disc drive housing, and instead is mounted to and supported by a damping mechanism 60, which is in turn fixedly mounted to the disc drive housing by, for example, a mounting clamp 62 using screws (not shown) inserted through screw holes 64.

The elements and operation of the damping mechanism 60 can best be understood from an examination of FIGS. 4, 5, 6-1 and 6-2.

Figure 4:
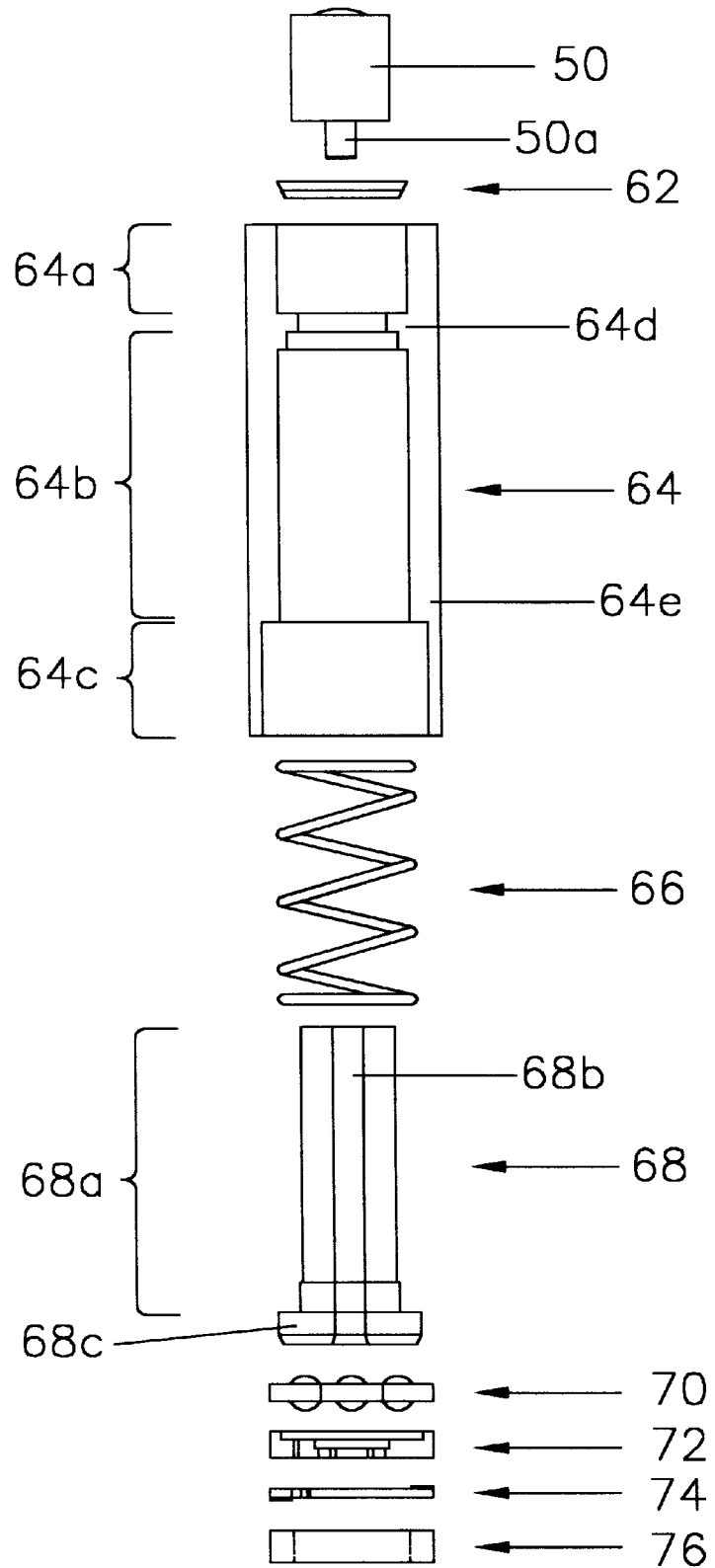
FIG. 4 is an exploded view of the components of the latching system of the present invention.
Figure 5:
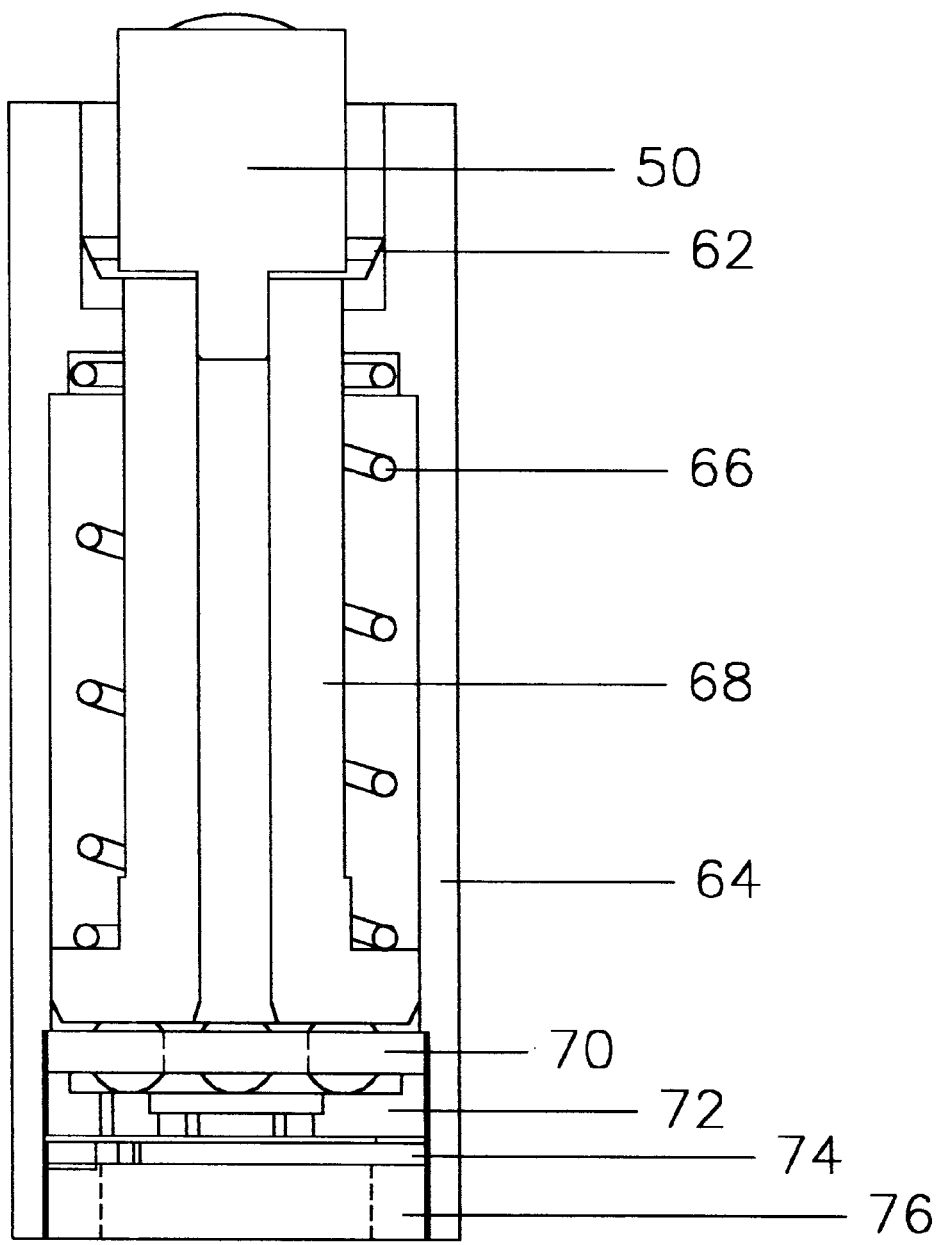
FIG. 5 is a sectional view of the latching system of the present invention in its assembled condition.

FIG. 4 is an exploded view of the elements that make up the damping mechanism of the present invention, which is particularly useful as a reference for the ensuing description of the individual elements and their features, while FIG. 5 is a sectional view showing the assembled relationship of the individual elements. The reader is therefore encouraged to look back and forth between FIGS. 4 and 5 during the ensuing discussion.

The latching and damping system includes a magnetic can assembly 50, similar to that of FIG. 2, which further includes a mounting shaft 50a. Since details of the assembly and interior elements of the magnetic can 50 are not within the scope of the present invention, the magnetic can 50 is shown in simple elevation in FIG. 4 and as a single element in the sectional view of FIG. 5.

The damping mechanism (60 in FIG. 3) includes a seal 62, an outer can element 64, a coil spring 66, and inner can element 68, a bumper element 70, a stepped seal element 72, a valve element 74 and a retaining ring 76.

The seal 62 is formed of a non-outgassing elastomeric material and has a central opening (not separately designated) sized to cooperate with the mounting shaft 50a of the magnetic can 50, and an outer diameter selected for cooperation with the inner diameter of a first portion of the outer can element 64, as will be discussed in more detail below. The function of the seal 62 is to restrict leakage of air during the response of the latching system to applied mechanical shocks, as will also be discussed in detail below.

The outer can element 64, preferably fabricated from a rigid plastic, or Teflon®-impregnated plastic, is divided into three major sub-sections: 1) a latch end 64a; 2) a spring chamber 64b, and; 3) a baffle portion 64c. The latch end 64a and spring chamber 64b are separated by a narrowed flange 64d, and the boundary between the spring chamber 64b and the baffle portion 64c is defined by a step 64e in the inner diameter of the outer can element 64.

The inner can element 68, also preferably fabricated from a Teflon®-impregnated rigid plastic for low friction, includes a shaft portion 68a with an inner bore 68b and a flange portion 68c. The outer diameter of the shaft portion 68a is selected to closely cooperate with the inner diameter of the narrowed flange 64d, while the diameter of the central bore 68b is selected to cooperate with the mounting shaft 50a of the magnetic can 50. During assembly, the mounting shaft 50a of the magnetic can is presently envisioned to be either press-fitted with or adhesively bonded to the central bore 68b of the inner can element 68.

The flange portion 68c of the inner can element 68 includes an outer diameter selected for close cooperation with the inner diameter of the spring chamber 64b of the outer can element 64, and the coil spring 66 is designed to bear against the lower surface of the narrowed flange 64d at its upper end, and against the top surface of the flange portion 68c of the inner can element 68 at its lower end.

The baffle portion 64c of the outer can element 64 is dimensioned to mount the bumper element 70, stepped seal element 72, valve element 74 and retaining ring 76, all of which have outer diameters selected to cooperate with the inner diameter of the baffle portion 64c of the outer can element 64.

The bumper element 70 is preferably fabricated from a non-out-gassing elastomeric material and includes a plurality of contact ball features (not separately designated) intended to form upper and lower contact points for contacting the lower surface of the inner can element 68 and the upper surface of the stepped seal element 72, respectively, and a large central opening, (also not separately designated) to allow for unrestricted air flow during compression and decompression of the damping mechanism. The bumper element 70 thus provides a soft contact element for the return of the inner can element 68 to the rest position shown The stepped seal element 72 is preferably fabricated from a rigid plastic material and includes several features that will be described in detail below.

The valve element 74 is preferably fabricated from a non-outgassing elastomeric material or flexible film material and includes several functional elements the operation of which will also be discussed in detail below.

The retaining ring 70 is preferably fabricated from a rigid plastic material and has a large central opening (not separately designated). It is presently envisioned that the retaining ring 70 will be adhesively bonded to the inner diameter of the baffle portion 64c of the outer can element during assembly to maintain the axial position of the bumper element 70, stepped seal element 72 and valve element 74.

Figures 1, 6:
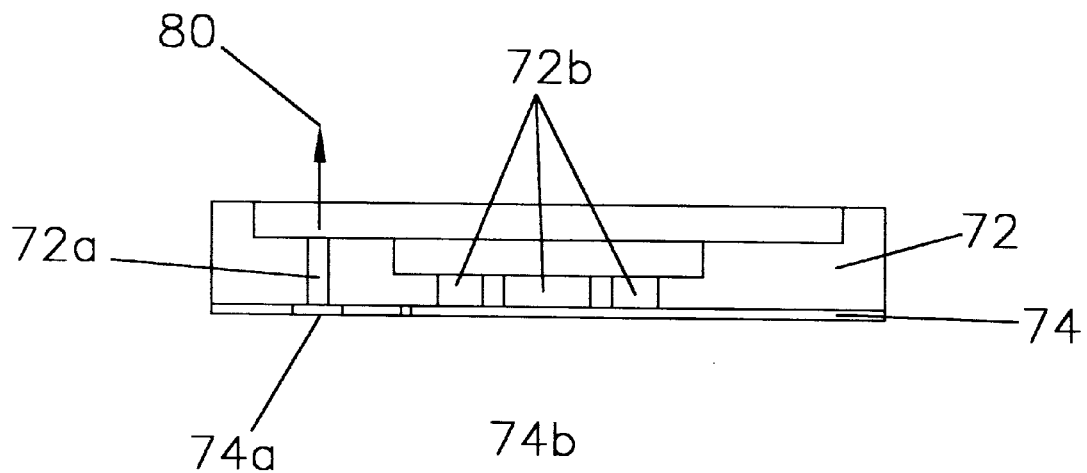
Figures 2, 6:
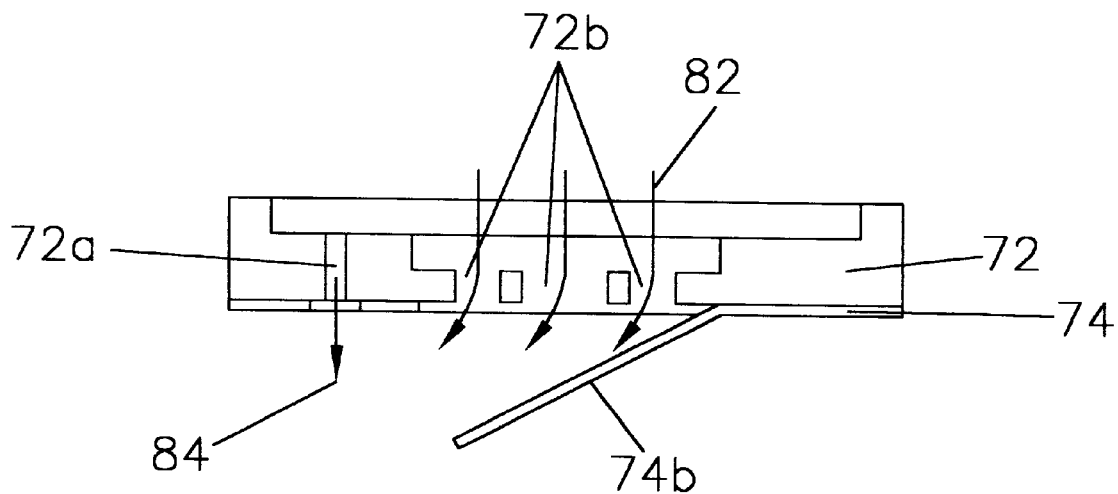

The specific elements and finctional operation of the stepped seal element 72 and the valve element 74 can best be seen in FIGS. 6-1 and 6-2, which are large scale sectional views of these elements.

FIG. 6-1 shows the response of the stepped seal element 72 and valve element 74 when an applied mechanical shock is in a direction to lengthen the damping mechanism. As can be seen in the figure, the stepped seal element 72 includes a control orifice 72a which is aligned with a cooperative opening 74a in the valve element 74. The stepped seal element 72 also includes a plurality of relatively large evacuation openings 72b. When the damping mechanism is in its rest position, and when the damping mechanism is being lengthened due to applied mechanical shock, the evacuation openings 72b are covered by a flap portion 74b of the valve element 74. Therefore, as the inner can element 68 moves upward in FIG. 5, a negative pressure is formed below the flange portion 68c of the inner can element 68 and air is drawn into the damping mechanism through only the control orifice 72a, as indicated by arrow 80.

It will be evident to one of skill in the art that the damping characteristics of the invention can be controlled in part by control of the length and diameter of the control orifice 72a, and, that should it be necessary for optimization of the design, the stepped seal element 72 could be configured to include a plurality of control orifices.

FIG. 6-2 shows the response of the valve element to downward motion of the inner can element, i.e., when the shock event has terminated and the damping mechanism is returning to its rest condition. Downward motion of the inner can element 68 relative to the outer can element 64 causes an increase in air pressure above the stepped seal element 72. This increased air pressure displaces the flap portion 74b of the valve element 74 to the open condition shown in FIG. 6-2, and thus allows the rapid expulsion of air from the damping mechanism through the evacuation openings 72b, as shown by arrows 82, and to a lesser extent through the control orifice 72a as shown by arrow 84. Thus the stepped seal element 72 and valve element 74 form a control mechanism that allows for controlled air flow in a first direction, and relatively unimpeded air flow in a second opposite direction.

It will be apparent to one of skill in the art that the specific location of the control orifice 72a, evacuation openings 72b, and flap portion 74b are a matter of design choice, and the scope of the present invention is envisioned to include all arrangements of comparable elements that provide the control of air flow noted above.

Once assembled, as shown in the cross-sectional view of FIG. 5, the inner can element 68, with attached magnetic can element 50, is maintained in a rest position relative to the outer can element 64 by the coil spring 66. Latching of the actuator is accomplished by bringing the contact feature 48 on the moving portion of the actuator into contact with the spherical contact feature 52 of the magnetic can 50, as was shown in FIG. 3. Unlatching of the actuator is accomplished by using the power of the actuator motor (24 in FIG. 1) to move the contact feature away from the magnetic can 50. As this movement is performed, the coil spring 66 is compressed between the narrowed flange 64d of the outer can element 64 and the flange portion 68c of the inner can element 68. As this compression occurs, the force being exerted on the magnetic interface between the contact feature 48 and the magnetic can 50 increases as a function of the coil spring 66, until such time as the spring generated force becomes greater than the magnetic latching force, and the actuator becomes free to move the heads across the discs in the disc drive. Once separation of the magnetic interface occurs, the coil spring 66 acts to displace the inner can element 68 back to its rest position relative to the outer can element 64. Thus the magnetic latching system of the present invention acts similarly to the prior art latching system of FIG. 2 under normal operation, and the same amount of unlatching force is required as was the case in the prior art latching system of FIG. 2.

When mechanical shocks are applied to the disc drive while the actuator is magnetically latched at the park position, the benefits of the present invention come into play. If the shock event occurs in a direction that tends to separate the actuator from the magnetic latch, the inner can element 68 bears against and compresses the coil spring 66 and thus yields in the direction of the applied mechanical shock as a function of the spring constant of the coil spring 66, and this motion is further damped by the action of the control orifice 72a in the stepped seal element 72, as was discussed above. Thus a short duration mechanical shock that would ordinarily be great enough to overcome the magnetic latching force is dissipated as the coil spring compresses and the spring force gradually increases.

At the termination of the shock event, the coil spring 66 acts to move the inner can element 68 back downward to its rest position, and this return motion is relatively undamped as a function of the one-way valve action described above in the discussion of FIGS. 6-1 and 6-2.

Thus the damping mechanism of the present invention functions as a basic unidirectional shock absorber. When the parallel combination of the damping mechanism is connected in series with a magnetic latch mechanism, the air damping mechanism can be sized and tuned to dissipate the actuator kinetic energy resulting from large, short-duration rotary shocks to the disc drive. A key feature of the sizing and tuning is to restrict the force levels at the magnetic interface so that the passive magnetic latch does not separate in response to the largest specified mechanical shock that must be withstood. Kinematically, the concept is to allow the latching system to stretch a controlled amount, but not unlatch. Spring preloads can be selected at values high enough such that the actuator will undergo no motion under slow-acting, low level handling-type excitations. Functional unlatching of the actuator from the magnetic latching elements requires no more actuator motor power than that needed in a rigidly mounted prior art magnetic latching system, such as that shown in FIG. 2.

In a specific implementation of the present invention, an air damping mechanism was designed for a 3.5 inch disc drive having actuators with inertias in the range of $30.0^{-6}$ to $60.0^{-6}$ in/pounds/sec$^2$. By careful selection of the spring material, coil diameter, coil pitch, number of turns, preload length and other variables familiar to one of skill in the art, including the optimization of the control orifice dimensions discussed above, it has been calculated that a damping system can be provided which is capable of ensuring proper latch operation in the presence of applied rotary mechanical shocks up to approximately 15,000 radians/sec$^2$.

It will be evident to one of skill in the art after reviewing this disclosure that alternative implementations can be developed that utilize internal pressures greater than ambient rather than the sub-ambient pressure implementation discussed in detail hereinabove. Moreover, the specific latching mechanism can be of a form other than the magnetic type shown. Furthermore, the scope of the present invention envisions that the damping mechanism does not have to be of the unidirectional type shown, and could provide damped motion in both directions of displacement. To optimize the damping characteristics of the invention, the control orifice can be fitted with a needle valve attached to the moving piston element so that air flow through the control orifice (the orifice co-efficient) can be made to be dependent on the instantaneous position of the moving element of the damping mechanism.

Additionally, the scope of the present invention is envisioned to include damping mechanisms that are not cylindrical in shape or formed from rigid materials. For instance, the damping mechanism could be formed as a bellows-type mechanism in either a linear or hinged configuration without exceeding the scope of the invention.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiment, certain variations and modifications may be suggested to one of skill in the art upon reading this disclosure. Therefore, the scope of the present invention should be considered to be limited only by the following claims.

What is claimed is:

1. A disc drive having a disc drive housing and an actuator for moving an array of heads relative to data recorded on a plurality of tracks on the surfaces of an array of discs, the actuator having a moving portion and the disc drive including a predetermined park location to which the moving portion of the actuator can be moved, the disc drive further comprising:

latching means for maintaining the actuator at the park location comprising
- a latching feature carried on the moving portion of the actuator, and
- a latching mechanism cooperating with the latching feature for generating a latching force which acts to hold the latching feature in contact with the latching mechanism, and mounting means for mounting the latching mechanism and supporting the latching mechanism in relation to the disc drive housing and the moving portion of the actuator, the mounting means further comprising damping means for providing controlled, damped compliance in parallel with the latching force; said damping means comprising:
- an outer can element fixed in relationship to the disc drive housing;
- an inner can element axially movable within the outer can element;
- bias means for maintaining the inner can element at a rest position relative to the outer can element, and;
- a valve mechanism for controlling the flow of air into and out of a cavity formed between the inner and outer can elements by motion of the inner can element relative to the outer can element.

* * * * *